(12) United States Patent
Lin (10) Patent No.: US 7,645,087 B1
(45) Date of Patent: Jan. 12, 2010

(54) EXPANDER NUT

(75) Inventor: Wen-Hwa Lin, Taichung Hsien (TW)

(73) Assignee: VP Components Co., Ltd., Taichung, Hsien (TW)

( * ) Notice: Subject to any disclaimer, the term of this patent is extended or adjusted under 35 U.S.C. 154(b) by 0 days.

(21) Appl. No.: 12/381,478

(22) Filed: Mar. 11, 2009

(51) Int. Cl.
*F16B 7/10* (2006.01)
(52) U.S. Cl. .................. 403/109.5; 403/314; 403/374.4
(58) Field of Classification Search ................. 280/279, 280/280; 403/109.5, 297, 314, 373, 374.1–374.4; 74/551.1
See application file for complete search history.

(56) References Cited

U.S. PATENT DOCUMENTS

| | | | | |
|---|---|---|---|---|
| 4,068,858 A | * | 1/1978 | Harrison et al. | 280/279 |
| 4,095,911 A | * | 6/1978 | Lacroix | 403/104 |
| 5,540,457 A | * | 7/1996 | Johnson | 280/279 |
| 5,647,684 A | * | 7/1997 | Chen | 403/370 |
| 5,680,798 A | * | 10/1997 | Luen | 280/279 |
| 5,737,974 A | * | 4/1998 | Chen | 280/279 |
| 5,924,336 A | * | 7/1999 | Richardson | 403/370 |
| 6,322,283 B1 | * | 11/2001 | Chen | 280/279 |

* cited by examiner

*Primary Examiner*—Victor MacArthur
(74) *Attorney, Agent, or Firm*—Charles E. Baxley (57) ABSTRACT

An expander nut is for being assembled to an upper end of a steering tube of a bicycle. The expander nut includes a base nut, two wedge halves having interlocking tapered surfaces and assembled to the base nut, a top cap mounted on the wedge halves, and a bolt screwed to the base nut for controlling the wedge halves to slide relatively along the tapered surfaces so that the wedge halves move outward to wedge an inner surface of the steering tube.

3 Claims, 8 Drawing Sheets

EXPANDER NUT

BACKGROUND OF THE INVENTION

1. Technical Field

The present invention relates to bicycle parts, and more particularly, to an expander nut for being assembled atop a stem of a bicycle so as to pull the stem downward to preload a set of head parts of the bicycle.

2. Description of Related Art

Various assembling parts for assembling a stem, a set of head parts, a head tube and a steering tube of a bicycle have been developed to date. One instance is U.S. Pat. No. 7,204,502, titled "Steering Bearing Assembly for Vehicle". In the following description related to this prior patent, all recited elements are referred to the numerals indicating the corresponding elements shown in the drawing sheet of the published Patent as can be obtained from the USPTO Web Patent Databases. This prior patent disclosed a head tube 30 accommodating a steering tube 23 and having a top bearing 40 and a bottom bearing 45 assembled to the top and bottom ends thereof. A handlebar stem tube 62 of a handlebar assembly is mounted atop the steering tube and preloads the top bearing 40 at the top end the head tube 30. A bolt 65 is installed in the top of the steering tube 23 to exert a downward force to the handlebar stem tube 62 so that the handlebar stem tube 62 presses downward and thus position the top bearing 40. Finally the handlebar stem tube 62 is tightened onto the steering tube 23 of the bicycle so that the stem, the head parts, the head tube and the steering tube are well assembled.

Figure 1:
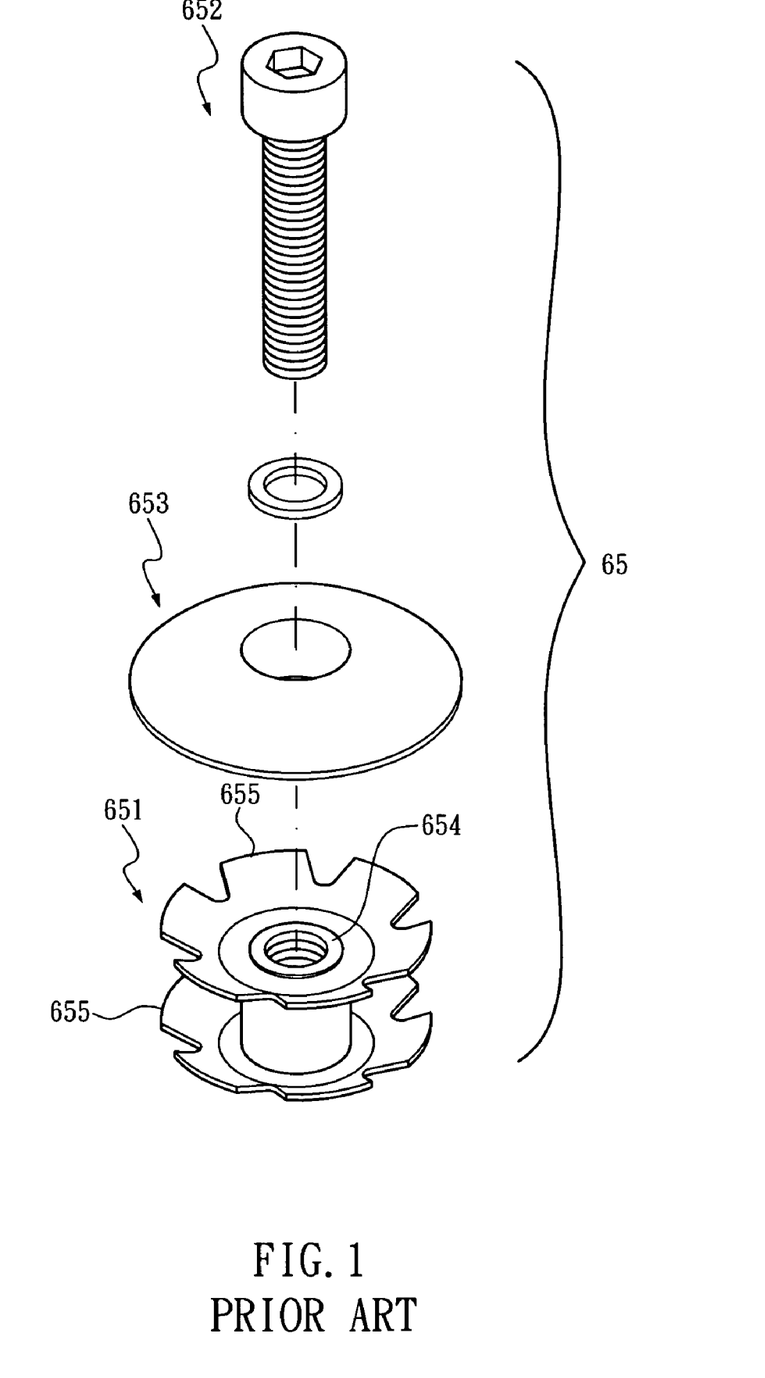
FIG. 1 is an exploded view of a bolt with a star nut according to a prior art.

Referring to FIG. 1 provided in the present application, the bolt 65 recited in the aforementioned prior patent is composed of a start nut 651, a screw 652 and a top cap 653. The screw 652 centrally passing through the top cap 653 and getting engaged with a threaded hole 654 of the start nut 651. The star nut has two discs of hardened steel each with a plurality of sharp tabs 655. The start nut 651 is placed into the steering tube so that the sharp tabs 655 engage on the internal bore of the steering tube. Due to the configuration of the discs, the start nut 651 is allowed to move inward the steering tube and retained from leaving the steering tube. The top cap 653 presses on the top of the stem so that when the screw 652 is tightened, the top cap 653 is pushed downward and in turn preloads the top bearing 40.

In the past when steering tubes were made from steel the star nut 651 was acceptable. Now steering tubes are made from aluminum alloy or even from carbon composite materials and so the damage that a star nut can cause when it is hammered in position is unacceptable and potentially dangerous. Besides, once the star nut 651 is assembled it cannot be removed without causing further damage and destructive deformation. Thus, the traditional device is unfavorable to stem replacement or head-parts preload adjustment.

Another instance is U.S. Pat. No. 5,737,974, titled "Fastening Assembly of Bicycle stem". In the following description related to this prior patent, all recited elements are referred to the numerals indicating the corresponding elements shown in the drawing sheet of the published Patent as can be obtained from the USPTO Web Patent Databases. In the prior patent, an assembly composed of a bolt 2, a stop cover 12, a spring torsion 6, an arresting tube 4, and a tightening head 3, gives a upright tube 1 a downward force. The spring torsion 6 is settled between the stop cover 12 and the arresting tube 4. The bolt 2 passes through the stop cover 12 and the arresting tube 4 to engage with a threaded hole of the tightening head 3. The arresting tube 4 is configured to have outward expandability. The tightening head 3 is settled in the arresting tube 4 and has a tapered outer periphery. When the bolt 2 is tightened, the tapered outer periphery of the tightening head 3 expands the arresting tube 4 to abut against the inner surface of the steering tube 7. The stop cover 12 pressed by the bolt 2 exerts the downward force to the upright tube 1, so as to fasten the head parts 9.

Though the spring torsion 6 is configured to compress when the arresting tube 4 is expanded, it can sometimes resile before the arresting tube 4 wedges the steering tube and thus causes the whole assembly to fail in preloading the upright tube 1. Besides, as the arresting tube 4 is substantially a tube with slots formed thereon and the tightening head 3 uses the tapered outer periphery to expand the arresting tube 4 from inside and support the expanded arresting tube 4 to tightly wedge the inner surface of the steering tube 7, gaps and concentrated point load between the arresting tube 4 and the steering tube 7 out of uneven expansion tend to happen and damage the steering tube.

SUMMARY OF THE INVENTION

Hence, one objective of the present invention is to provide an expander nut for assembling a stem, a set of head parts, a head tube, and a steering tube of a bicycle. The disclosed expander nut exerts an axial load to the stem by a non-destructive means so as to assemble and position the previously recited components.

Another objective of the present invention is to provide an expander nut that causes no gaps and gives a very uniform hoop stress within a steering tube, thereby eliminating concentrated point load to the steering tube and prolonging service life of the steering tube.

Another objective of the present invention is to provide an expander nut that can easily be removed and reassembled without damage and requires only standard hand tools for assembly and disassembly thereof.

Another objective of the present invention is to provide an expander nut that can be economically made of aluminum or engineering plastics.

Another objective of the present invention is to provide an expander nut that eliminates use of a compression spring that is usually heavy, and thus is light in weight.

The expander nut of the present invention comprises a cylindrical base nut mounted thereon a first wedge half and a second wedge half. The two wedge halves having a first tapered surface and a second tapered surface, respectively, when combined, jointly form a close circular ring. A top cap is placed atop the circular ring and is such fastened to the base through a bolt that the first wedge half and the second wedge half are allowed to move relatively along the flat tapered surfaces thereof, thereby making the circular ring diametrically expanded. The wedge halves are placed atop a steering tube of a bicycle so that the resulting circular ring can be diametrically expanded under control of the top cap to wedge and exert an even hoop pressure upon an inner wall of the steering tube. Meantime, the top cap provides a preload to an upper end of a stem that is mounted around the steering tube and so as to make the stem press a set of head parts located therebelow. Finally the assembly of the stem, the head parts, the head tube, and the steering tube is accomplished by tightening the stem onto the steering tube.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE PREFERRED EMBODIMENT

While a preferred embodiment is provided hereinafter for illustrating the concept of the present invention as described above, it is to be understood that the components of the embodiment shown in the accompanying drawings are depicted for the sake of easy explanation and need not to be made in scale.

Figure 2:
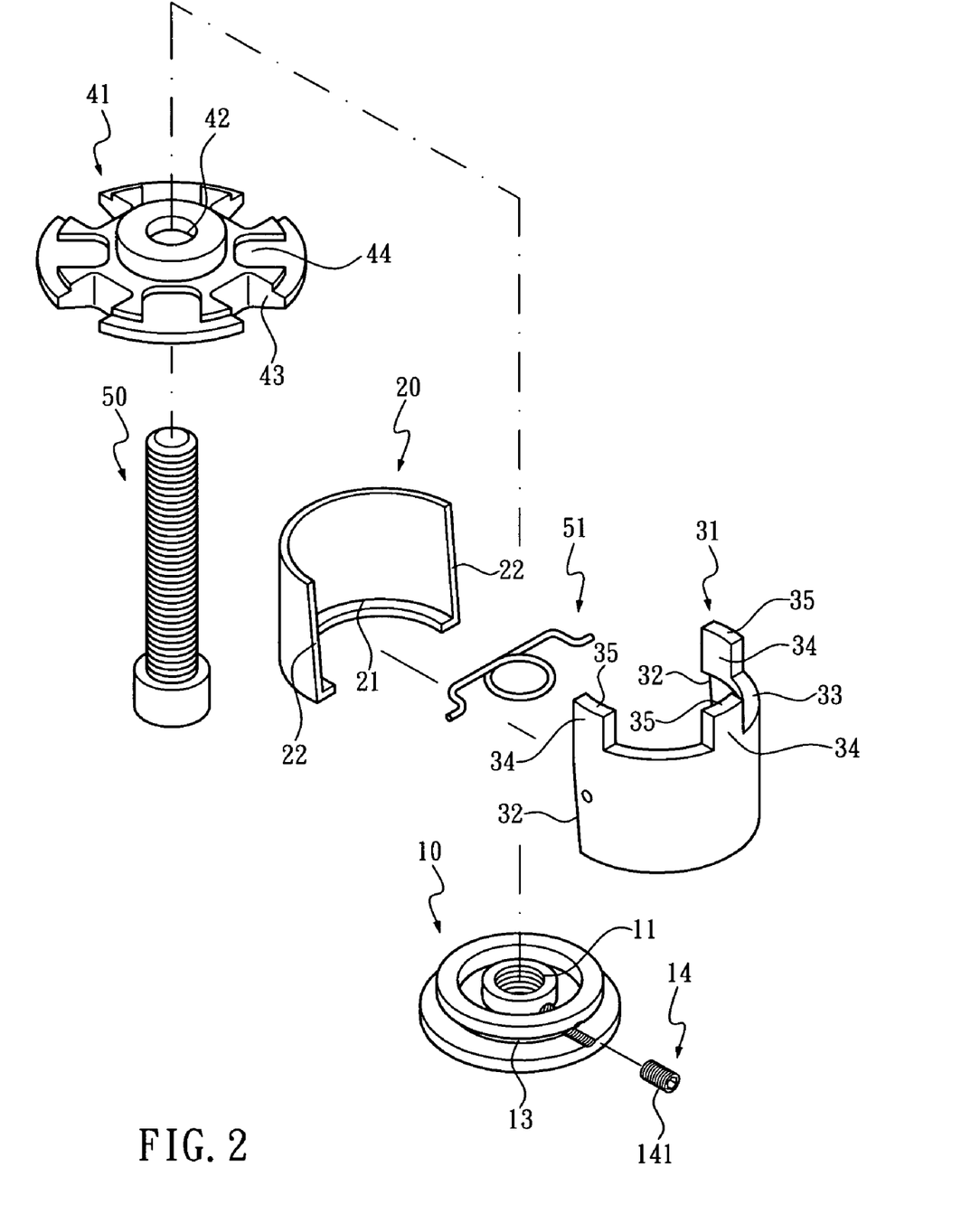
FIG. 2 is an exploded view of an expander nut of the present invention.

As can be seen clearly from FIG. 2, an expander nut of the present invention a base nut 10, a first wedge half 20, a second wedge half 31, a top cap 41, and a bolt 50.

The base nut 10 has centrally a threaded hole 11 and peripherally an annular accommodating groove 13.

The first wedge half 20 has a flange 21 extended inward from a bottom thereof to be received in the accommodating groove 13. An anti-rotation device 14 is provided at the base nut 10 for preventing the first wedge half 20 from sliding along the accommodating groove 13. According to the present embodiment, the anti-rotation device 14 is a grub screw 141 extended radially in the base nut 10. The grub screw 141 serves to engage one end of the flange 21 so as to prevent the first wedge half 20 from sliding along the accommodating groove 13.

The second wedge half 31 and the first wedge half 20 jointly form a close circular ring. The circular ring has an outer diameter L1 slightly greater than a diameter L2 of a bottom of the base nut 10 (shown in FIG. 5). The two wedge halves 20, 31 are interlocked with a first tapered surface 22 and a second tapered surface 32 so as to closely jointly form the close circular ring. The first tapered surface 22 and the second tapered surface 32 each has a taper angle ranging between 10 and 20 degrees. A plurality of protruding castellations 34 spaced at a certain distance from one another are formed at a top 33 of the second wedge half 31. Therein, tops of the protruding castellations 34 are preload surfaces 35.

The top cap 41 centrally has a through hole 42 and radially has a plurality of through slots 43. At a bottom of the top cap 41, between each two adjacent said through slots 43, a pocket-shaped preload portion 44 is provided.

The bolt 50 passing through the through hole 42 of the top cap 41 gets engaged with the threaded hole 11 of the base nut 10. The second wedge half 31 is tethered to bolt 50 by a spring clip 5 so as to remain the second wedge half 31 and the first wedge half 20 connected.

Figure 3:
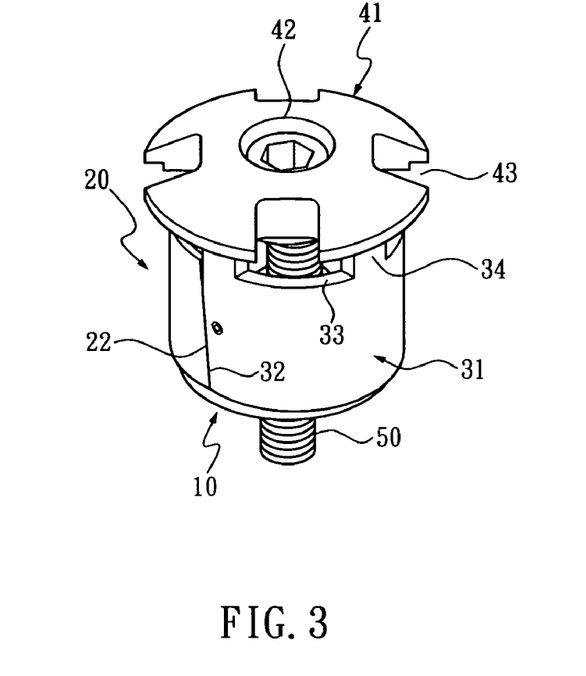
FIG. 3 is a perspective view of the expander nut in a first position.
Figure 4:
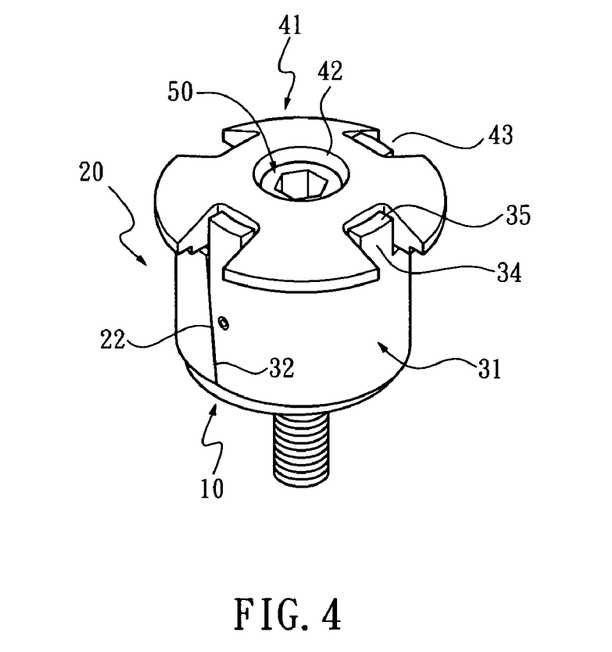
FIG. 4 is a perspective view of the expander nut in a second position.

Referring to FIGS. 3 and 4, the top cap 41 and the second wedge half 31 can engage in two alternative positions as be described in detail below.

The first position is shown in FIG. 3. Therein, the preload portions 44 (shown in FIG. 1) of the top cap 41 align with the preload surfaces 35 of the protruding castellations 34 formed on the second wedge half 31. When the bolt 50 is tightened, the top cap 41 pushes the second wedge half 31 downward. Due to the interlocked first tapered surface 22 and the second tapered surface 32, when the second wedge half 31 slides downward, the expander nut diametrically expands outward.

In the second position, as shown in FIG. 4, the protruding castellations 34 of the second wedge half 31 are received in the through slots 43 of the top cap 41. In virtue of the anti-rotation device 14 provided at the base nut 10, the first wedge half 20, the second wedge half 31 and the top cap 41 are retained from rotation.

The above-discussed first and second positions are for the expander nut to wedge a steering tube and press a stem of a bicycle. According to FIGS. 5, 6 and 7, a stem 81, head parts 82, a head tube 83 and a steering tube 84 are assembled in a conventional manner.

Figure 5:
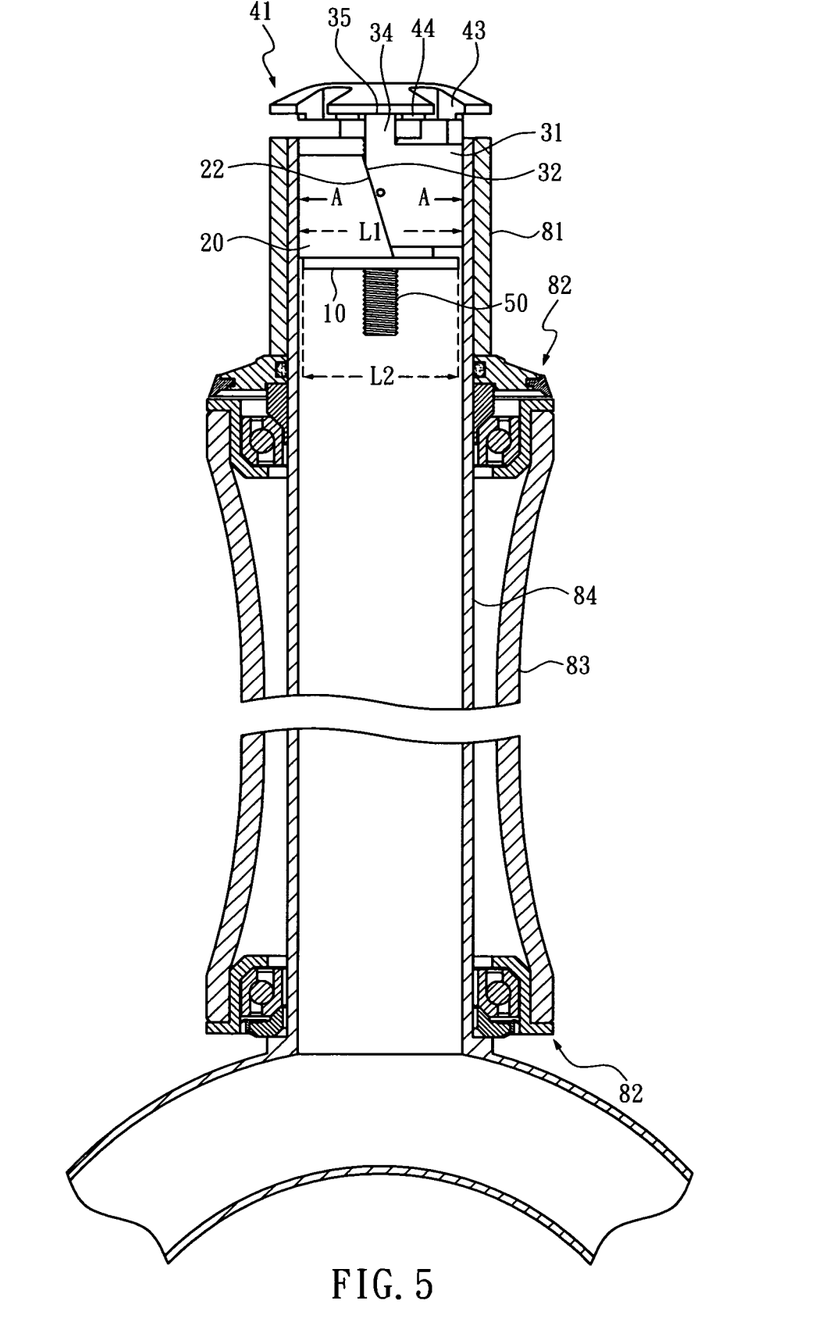
FIG. 5 is a schematic drawing showing the expander nut is used to assemble a stem, a set of head parts, a head tube and a steering tube of a bicycle, wherein a first wedge half and a second wedge half of the expander nut cooperatively wedge an inner surface of the steering tube.

In FIG. 5, the base nut 10, the first wedge half 20 and the second wedge half 31 of the expander nut are placed into the steering tube 84 at an upper end thereof. At this time, the top cap 41 and the second wedge half 31 are combined in the first position, meaning that the preload portions 44 of the top cap 41 contact the preload surfaces 35 of the second wedge half 31. When the bolt 50 is tightened, the expander nut is diametrically expanded as indicated by Arrow A, so that outer surfaces of the first wedge half 20 and the second wedge half 31 tightly wedge the inner surface of the steering tube 84. Consequently, the steering tube 84 receives an even annular pressure without concentrated point load, thereby having prolonged service life.

Figure 6:
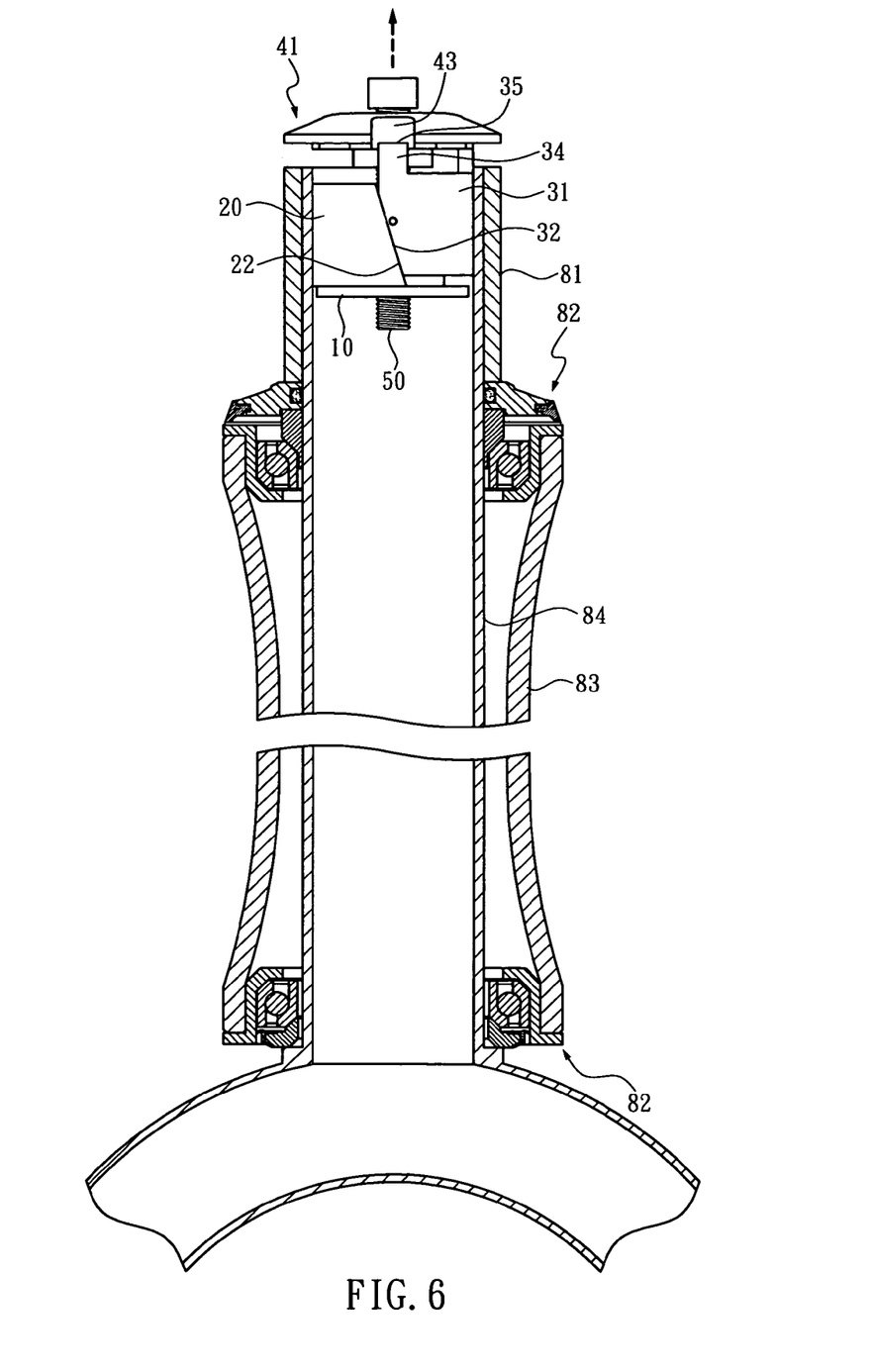
FIG. 6 is a schematic drawing showing that after the wedge halves wedge the inner surface of the steering tube, a bolt is loosened and a top cap is adjusted.

In FIG. 6, after the bolt 50 is loosened, the top cap 41 is allowed to rotate and then has its through slots 43 aligned with the protruding castellations 34 of the second wedge half 31. At this time, since the first tapered surface 22 and the second tapered surface 32 remains self-locking between the wedge halves 20 and 31, it is ensured that the wedge halves 20 and 31 still tightly wedge the steering tube 84 without loosening.

Figure 7:
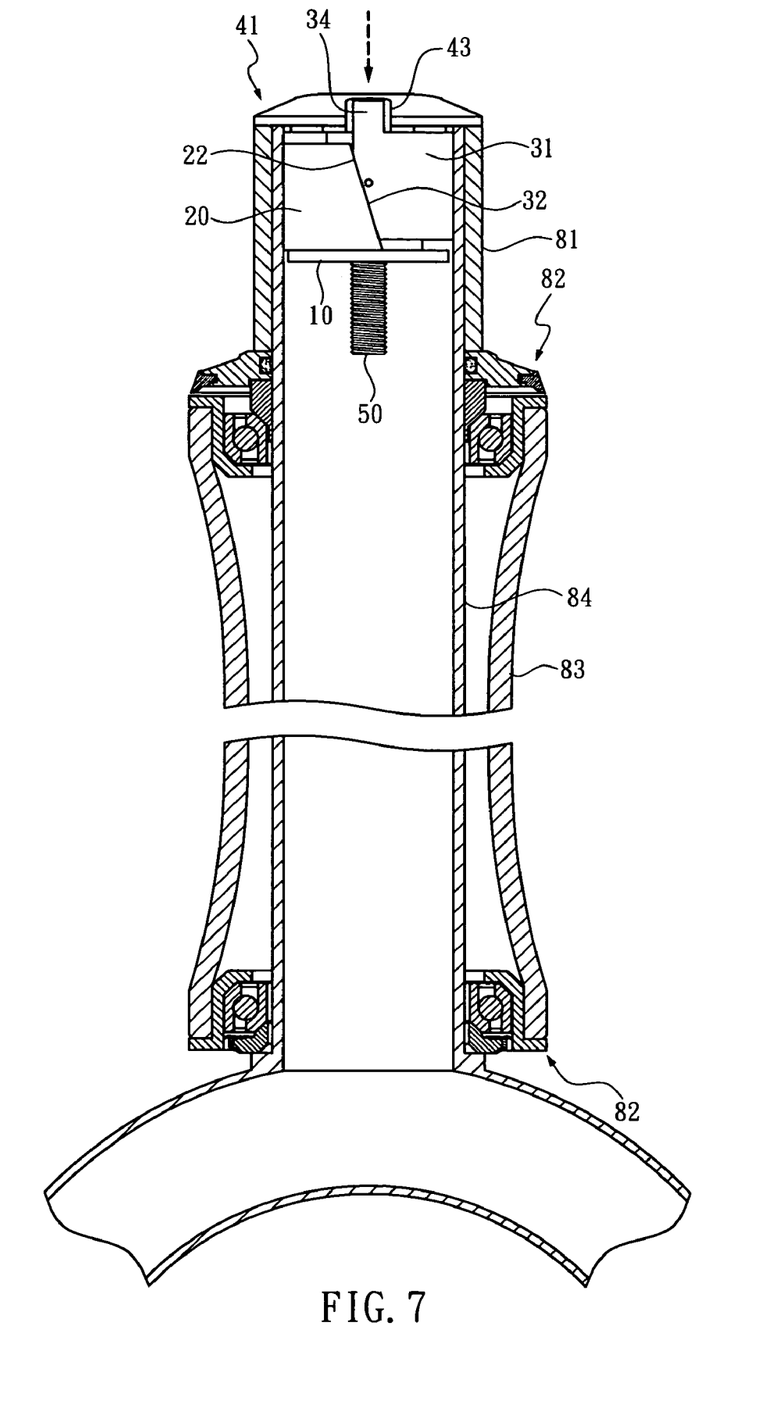
FIG. 7 is a schematic drawing showing the bolt tightened to press the top cap downward.

Referring to FIG. 7, the bolt 50 is tightened again to pull the top cap 41 downward so that the protruding castellations 34 get retained in the through slots 43. Thus, the top cap 41 and the second wedge half 31 are combined in the second position. Thereby, the expander nut of the present invention is retained from rotation and tightly wedges the steering tube 84. The downward pulled top cap 41 preloads the stem 81 and makes the same press and in turn position the head parts 82 located below the stem 81. Finally the stem 81 is tightened onto the steering tube 84 and the assembly is accomplished. The top cap 41 provides an axial load to the stem 81 by a non-destructive means and facilitates assembling the stem 81, the head parts 82, the head tube 83 and the steering tube 84.

Figure 8:
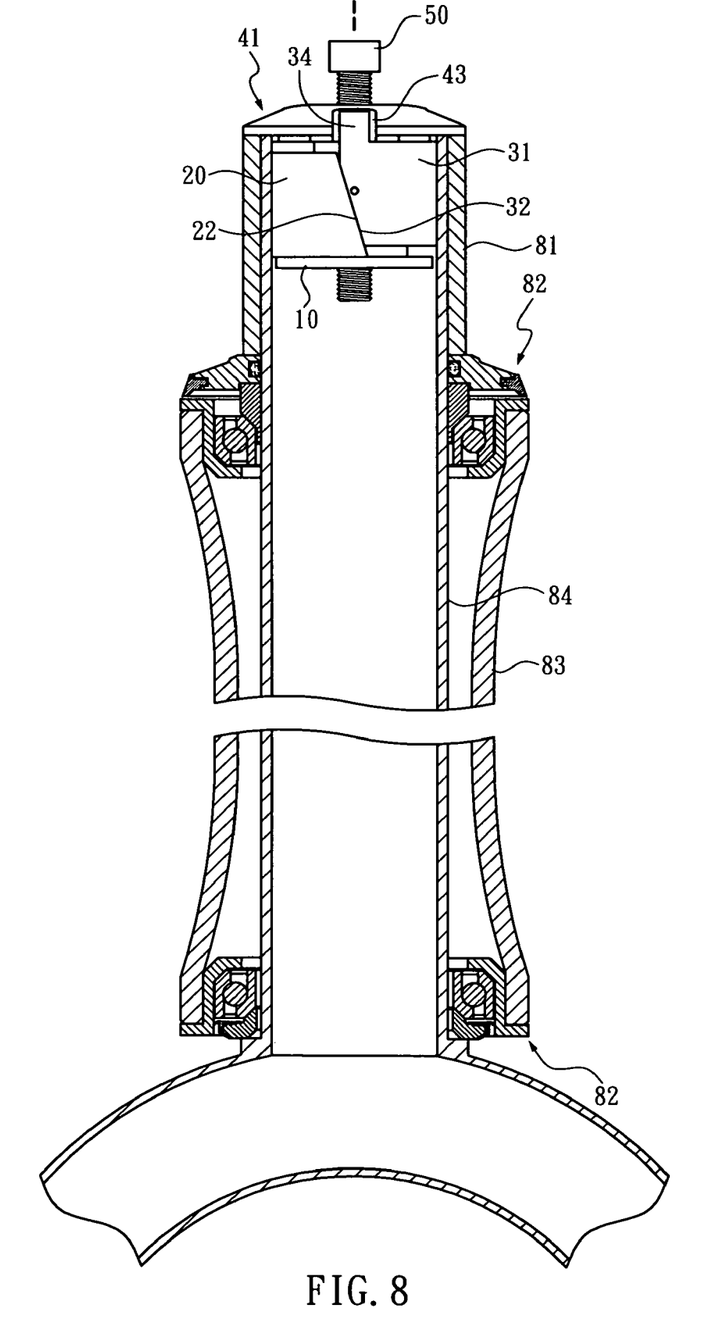
FIGS. 8 and 9 are schematic drawings showing the expander nut disassembled from the steering tube.
Figure 9:
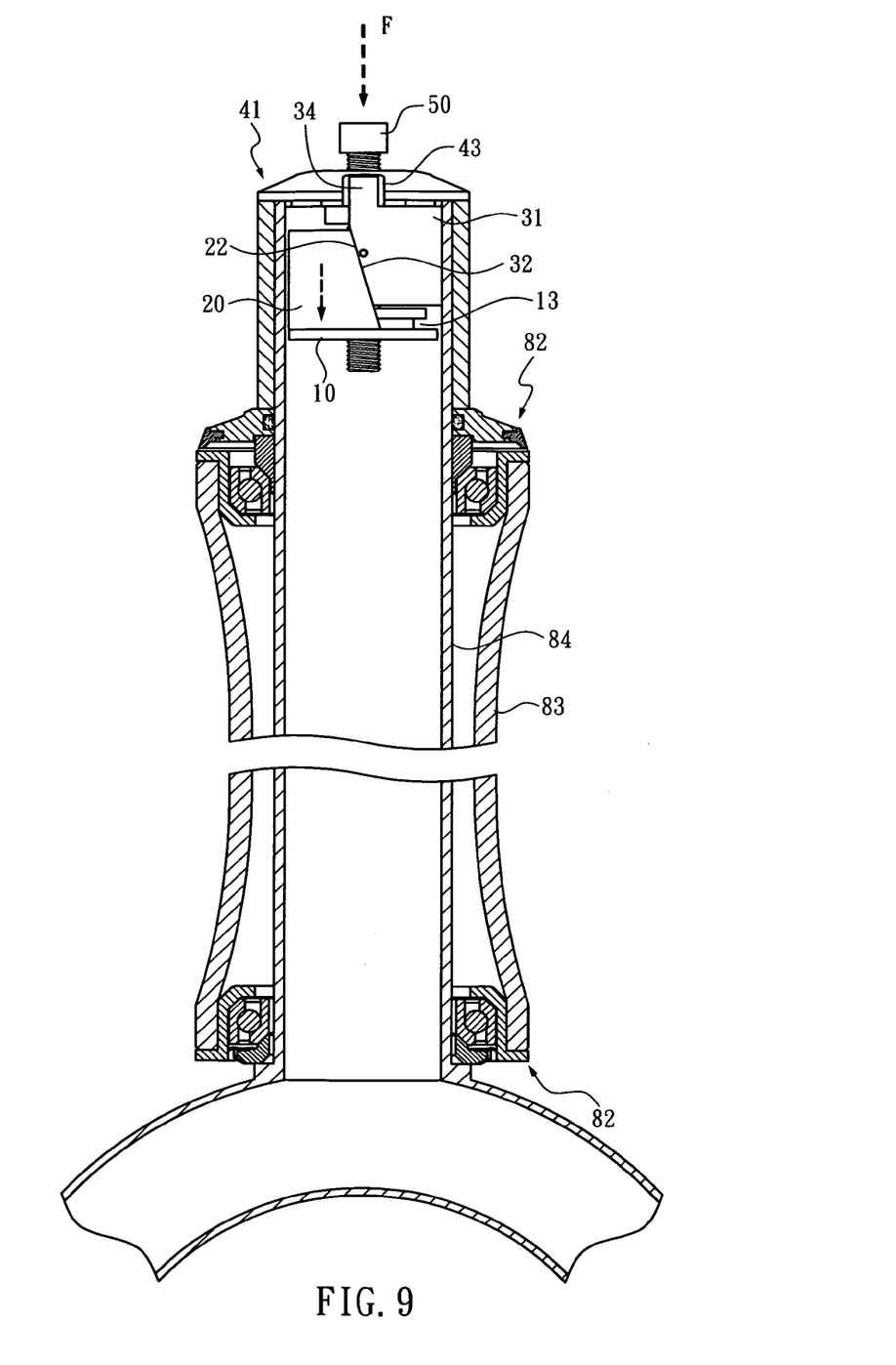

FIGS. 8 and 9 further illustrate how the expander nut is disassembled form the steering tube 84. The expander nut can easily be disassembled from the steering tube 84 of the bicycle by loosening the bolt 50 and then tapping the bolt 50 down, as indicated by Arrow F. Thereby, the bolt 50, the base nut 10 and the first wedge half 20 move downward to release the self-locking between the two wedge halves 20, 31. The expander nut can now be withdrawn by lifting the top cap 41.

The expander nut can easily be removed and reassembled without damage by using standard hand tools.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An expander nut, comprising:
   a cylindrical base nut centrally having a threaded hole;
   a first wedge half having a first tapered surface;
   a second wedge half having a second tapered surface, wherein the second tapered surface interlocks with the first tapered surface and when the first wedge half and the second wedge half are combined, the two wedge halves jointly forms a close circular ring, the first wedge half being connected to the base nut, and the two wedge halves being allowed to move relatively against the two tapered surfaces;
   a top cap having centrally a through hole and having a preload portion at a bottom thereof for contacting a top of the second wedge half;
   a bolt passing through the through hole of the top cap and getting engaged with the threaded hole of the base nut;
   an annular accommodating groove formed at a periphery of the base nut for receiving a flange extending inward from a bottom of the second wedge half, the base nut having an anti-rotation device for preventing the first wedge half from sliding along the accommodating groove, the anti-rotation device being a grub screw extended radially in the base nut and engaging one end of the flange; and
   a plurality of protruding castellations spaced at a predetermined distance from one another and formed at the top of the second wedge for being received by through slots in the top cap, tops of the protruding castellations being preload surfaces for contacting the preload portion of the top cap.

2. The expander nut of claim 1, wherein the first tapered surface and the second tapered surface each has a taper angle ranging between 10 and 20 degrees.

3. The expander nut of claim 1, an outer diameter of the close circular ring is slightly greater than a diameter of a bottom of the base nut.

* * * * *